Nov. 7, 1950 R. LAPSLEY 2,529,400
FLUID IMPACT COUPLING AND CLUTCH
Filed Oct. 18, 1947 2 Sheets-Sheet 2
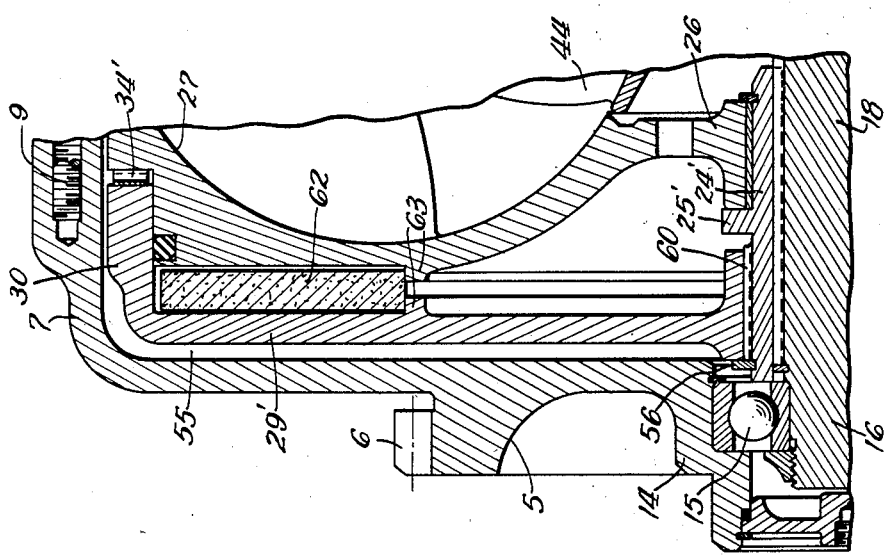
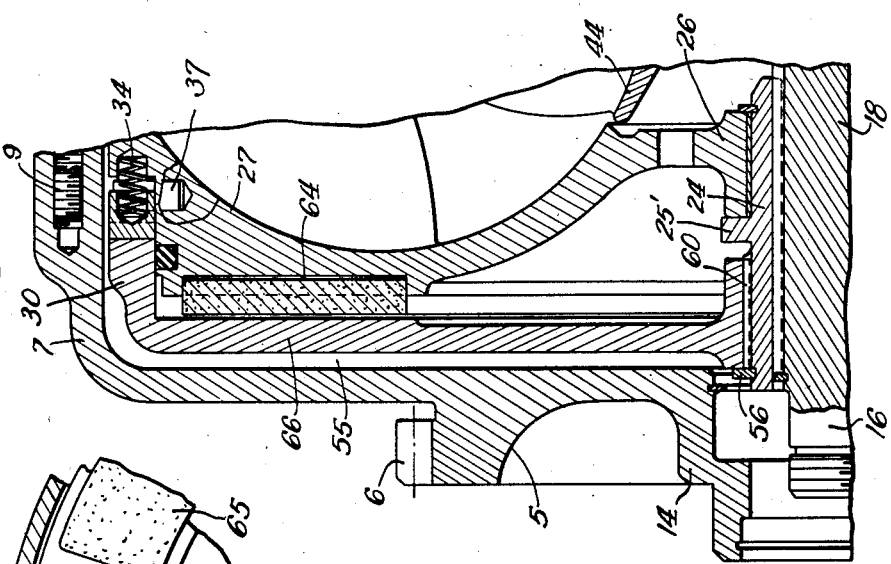
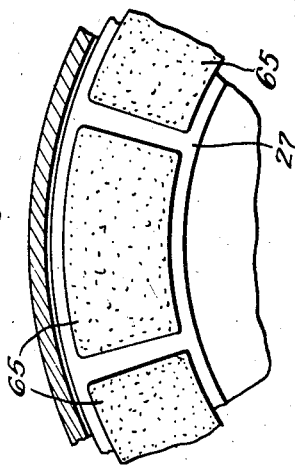
Inventor:
Robert Lapsley
By Walter E. Schirmer
Attys.

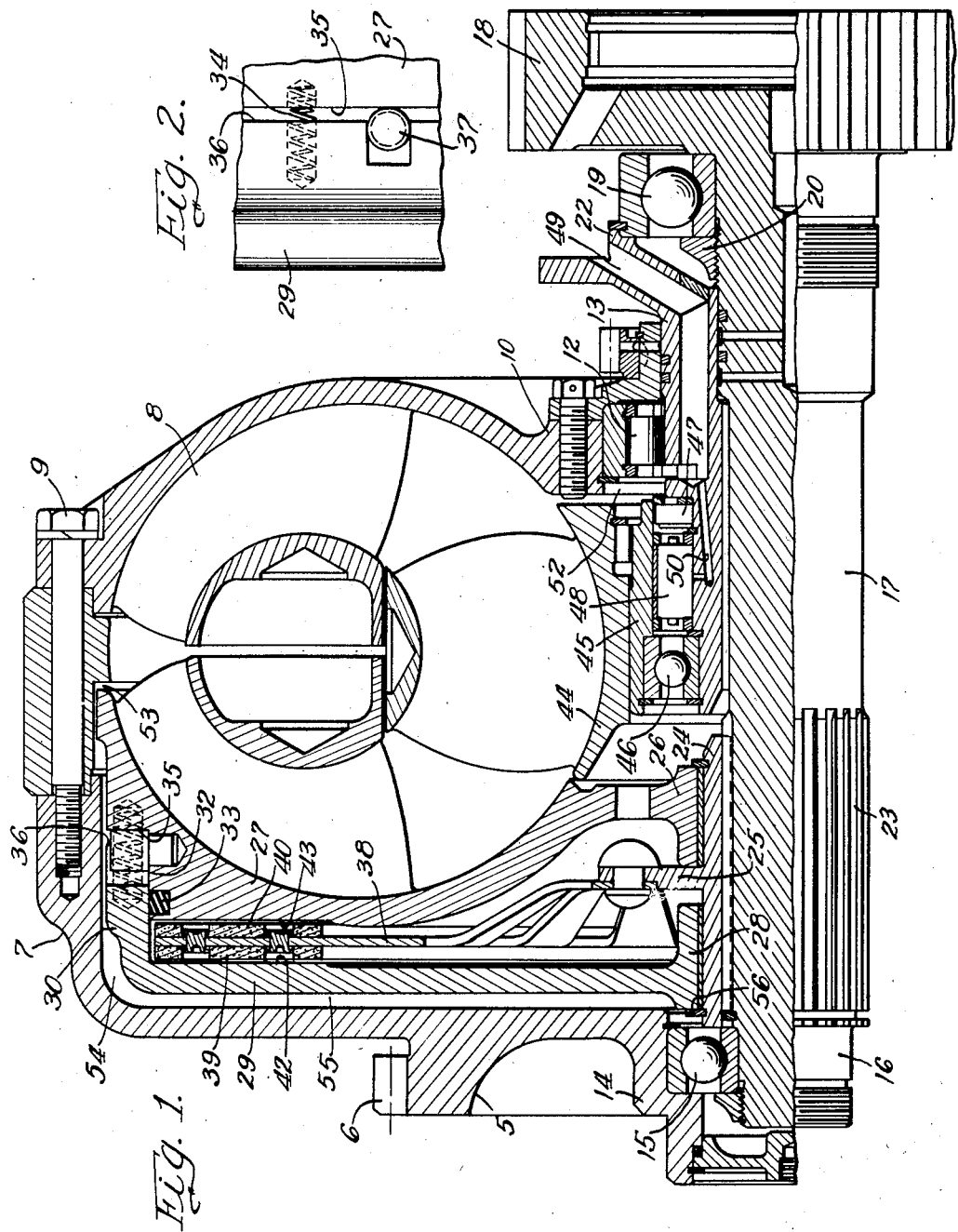

Patented Nov. 7, 1950

2,529,400

UNITED STATES PATENT OFFICE 2,529,400

FLUID IMPACT COUPLING AND CLUTCH

Robert Lapsley, Berrien Springs, Mich., assignor to Clark Equipment Company, Buchanan, Mich., a corporation of Michigan Application October 18, 1947, Serial No. 780,630

8 Claims. (Cl. 192—3.2)

This invention relates to torque converters and more particularly is concerned with a novel clutching arrangement for controlling the clutching of the turbine or driven element of the torque converter to the output shaft of the converter under various operating conditions.

In the use of torque converters where change speed gearing is employed behind the converter to give various ranges of torque in addition to the infinite speed and limited torque variations of the converter, itself, it has been found extremely difficult to effect proper shifting of the gears in the transmission due to the fact that even when the engine is idling, there is torque imposed upon the main shaft of the transmission due to the converter action, producing clashing of gears when shifting is to be effected or rendering it difficult to mesh the clutch means in the transmission.

One object of the present invention is to eliminate this problem by providing a secondary clutch member interposed between the driven element of the converter and the shaft on which it is journalled, which clutch element is so arranged that the turbine member will be clutched to the shaft at all times that torque is desired, but will become unclutched when the engine drops to idling speed.

Another object of the present invention is to provide a clutch between the shaft and the turbine element of the converter, which clutch is automatically controlled in accordance with engine speed.

A still further object of the present invention is to provide a clutch between the turbine and its shaft which is operable in accordance with oil pressure, which oil pressure is, of course, responsive to the speed of the converter and directly responsive to the speed of the pump member which is a function of engine speed.

Still other objects and advantages of the present invention are to provide a simplified clutch element for use in a torque converter to release the driven element from its shaft during idling of the engine in order to release this shaft from torque and consequently facilitate the shifting of gears driven by the shaft.

Other objects and advantages of the invention will appear more fully from the following detailed description which, taken in conjunction with the accompanying drawings, will disclose to those skilled in the art, the particular construction and operation of preferred forms of the present invention.

In the drawings:

Figure 1 is a sectional view through a converter embodying the present invention.

Figure 2 is a partial plan view taken substantially on line 2—2 of Figure 1.

Figure 3 is a partial sectional view of a modified form of the present invention.

Figure 4 is a corresponding view of a still further modified form of the invention; and Figure 5 is a side view of the clutch element employed in the construction shown in Figure 4.

Referring now in detail to the drawings, there is provided a flywheel member 5, which is suitably connected to the crank shaft of an engine (not shown) to be driven directly thereby, and which preferably includes a driving gear portion 6, or the member 5 may be bolted or otherwise secured to the flywheel end of the crank shaft and is adapted to form a housing portion 7, enclosing the torque converter and including the pump element 8, forming the driving element of the converter. The sections 7 and 8 are bolted together by peripheral studs 9 in any desired manner, and the member 8 is provided with a hub portion 10, mounted upon a suitable roller bearing assembly 12, which, in turn, is mounted upon a fixed sleeve member 13, to be described in detail hereinafter.

The flywheel member 5 has a hub portion 14 mounted upon the ball bearing 15, carried on the reduced end 16 of a shaft, indicated generally at 17, which shaft constitutes the driven shaft of the converter and is adapted to be provided at its opposite end with the enlarged drive gear or pinion portion 18, extending into a transmission or gear case. A suitable bearing assembly 19, supports the end of the shaft adjacent the gear portion 18 upon the forward wall of the gear case housing, and, in turn, is held in position by the threaded collar 20, and by an annular flanged portion 22 of the sleeve 13.

The shaft 17 is provided with a splined portion, indicated generally at 23, upon which is mounted a hub member 24, having a radially flanged portion 25 intermediate its ends. Mounted on the annular surface of the hub member 24 on opposite sides of the flanged portion, is the hub 26 of the turbine member 27 of the torque converter and the hub 28 of a clutch actuating flange member 29, associated with the turbine element 27 and having an axially directed peripheral portion 30, extending over an annular shoulder 32 on the member 27, and sealed with respect thereto by means of the annular resilient seal ring 33.

Suitable spring elements 34 are biased between the adjacent faces 35 and 36 of the members 27 and 29, normally tending to spread these members apart, and suitable stud or dowel pins 37 are provided for locking the two members for conjoint rotation.

The flange 25 of the spline sleeve 24 is provided with a radially extending spider member 38, which carries adjacent the outer periphery, opposed clutch facing discs 39 and 40, which discs are disposed adjacent two corresponding clutch faces 42 and 43 of the members 29 and 27.

The converter is also provided with a reaction member 44 interposed between the pump element 8 and the turbine element 27, which reaction member is splined upon a sleeve 45, journalled by means of the bearings 46 and 47 on the extending portion of the fixed sleeve 13, and including therebetween, a one-way roller clutch member 48, which allows forward rotation of the member 44, but locks the member 44 against reverse rotation and to the fixed sleeve 13.

It will be noted that the fixed sleeve 13 is provided with port means 49 by which oil may be introduced through the port means 50 to the one-way clutch 48. However, the major portion of this oil passes through the space 52 between the bearings 12 and 47, and thence into the interior of the converter. As the oil fills the converter, a portion of the oil passes outwardly through the periphery of the converter through the passageway 53, and thence along the outer annular surface of the element 27 into the annular space 54 about the periphery of the element 29. This oil also fills the radial space 55 between the housing member 5 and the outer radial face of the disc 29. It will be noted that the hub portion 28 of the disc is mounted on the sleeve 24 by means of a bushing which allows it freedom of movement toward the right as viewed in Figure 1.

During idling operation of the converter, that is, when the engine is driving the pump element 8 at idling speed, there is not sufficient oil pressure pressure built up within the converter or within the chamber 55 to effect axial movement of the disc 29 against the pressure of springs 34. However, as the engine picks up speed, the oil within the converter increases in pressure at a very rapid rate and, as a result, the pressure of the oil in the space 55 acts to force the disc 29 to the right. This brings the surfaces 42 and 43 into frictional contact with the opposed clutch faces 39 and 40 thereby producing a clutching action of the elements 27 and 29 to the spider member 38. This clutches these elements to the member so that their rotation transmits torque through the sleeve 24 to the shaft 23, and consequently to the gear 18.

When the engine is again reduced to idling speed, this pressure is released, and as a result, the springs 34 function to move the disc 29 to the left up against its abutment 56, and consequently produces disengagement of the clutch faces thereby allowing the driven element 27 to rotate idly about the sleeve 24 with no torque being transmitted to the shaft 17.

It has been found in the operation of converters of this type, that the length of time required to build up the oil pressure when the engine is accelerated from idling is very minute and consequently, the clutch action is almost instantaneous as the engine starts to pick up speed. This, together with the cushioning action of the oil itself within the converter, provides a very smooth coupling of the driven element 27 to the shaft 17, and similarly allows a quick declutching action when the engine is idled and it is intended to shift gears with no torque being imposed upon the shaft 17.

The amount of pressure required in the springs 34 may be adjusted as desired in accordance with the idling speed of the engine to give the desired clutching action at a particular engine speed. The operation of the converter itself, is conventional, and the present invention resides mainly in the mounting of the various elements and the arrangement of the clutch action by which the torque can be imposed or disengaged from the shaft 17 in respect to the speed of rotation of the engine or pump element 8.

In Figure 3 there is disclosed a modified form of the invention, but similar reference numerals are employed to indicate similar parts corresponding to those shown in Figure 1. However, in this form of the invention of the sleeve 24', which is splined upon the shaft 18, is provided only with a short radial abutment 25' for maintaining the hub 26 of the driven element 27 in axially fixed position. The disc member 29' in this form of the invention, is splined upon external splines 60, formed in a portion of the sleeve 24' and thereby in driving engagement with the shaft 18.

The member 29' also is provided adjacent its outer periphery with the axially flanged portion 30', which, in this case, overlaps the annular shoulder of the member 27 to an appreciable extent and is spaced therefrom in an axial direction by a wave-like annular spring member 34' which normally maintains the disc 29' in a position against the abutment 56.

Interposed between the member 27 and the disc 29' is an annular clutch ring 62, which floats between these two members and is supported by annular shoulders 63, formed on adjacent faces of the members 27 and 29'. In the operation of this modified type of construction, the spring 34' normally maintains the members 29' and 27 out of clutching engagement with the ring 62. However, when the engine is accelerated above idling speed, the oil in the chamber 55 increases in pressure and operates to force the disc member 29' to the right along the splines 60 until the adjacent faces of this member and the member 27 are pressed into frictional contact with the clutch ring 62 against the pressure of spring 34', thereby producing a clutching action by which the member 27 drives the member 29', which, in turn, imparts driving torque to the shaft 18.

Similarly, when the engine again is reduced to idling speed, this oil pressure is released and the spring 34 then forces the member 29' axially out of clutching engagement, thereby releasing the connection between the member 27 and the shaft 18 so that no torque is imposed upon the shaft 18 while the engine is idling.

In Figures 4 and 5, a still further modified construction is provided in which the outer face of the element 27 is provided with pockets of arcuate shape, indicated at 64, each of which is adapted to receive an arcuate clutch shoe or segment 65, which may be permanently seated therein. These elements consequently rotate with the member 27 and form an interrupted clutch facing on the outer surface thereof. The member 66, corresponding to the members 29 and 29' in this form of the invention, is arranged similarly to the member 29' being normally urged away from the member 27 by the spring 34, and an annular wear ring, and being splined on the sleeve member 24 by the spline 60 as described in connection with Figure 3.

The chamber 55, between the housing 7 and the member 66, is filled with oil in the same manner as previously described, and when the engine is accelerated and the pressure on this oil is increased, it is sufficient to move the member 66 axially against the pressure of spring 34 into engagement with the arcuate clutch segment 64, thereby clutching the members 27 and 66 together to impart driving torque to the shaft 18.

Also, as previously described, when the engine speed is reduced to an idling speed, the oil pressure drops and the springs 34 are again operative to release the clutching engagement so that the member 27 may rotate independently and not transmit torque to the shaft 18.

It is thus believed apparent that the present construction provides an engine speed responsive clutch mechanism for controlling the transmission of torque from the converter element to the shaft extending into the transmission and for insuring the release of torque on this shaft when the engine is at idling speed.

I am aware that various changes may be made in the construction herein disclosed without in any way departing from the underlying principles of the present invention, and I therefore do not intend to be limited except as defined by the scope and spirit of the appended claims.

I claim:

1. In combination, a fluid torque transmitter comprising a driving member, a driven member housed within said driving member and driven thereby, a shaft adapted to be driven from said driven member and rotatably supporting said driven member, a clutch member housed in said driving member and splined on said shaft, spring means normally biasing said clutch member out of clutching engagement with said driven member, and means responsive to increase in fluid pressure in said transmitter over that available when said transmitter is idling for shifting said clutch member into engagement with said driven member to drive said shaft.

2. In combination, a fluid torque transmitter including a driving member and a driven member, said driving member having a housing encircling said driven member, a shaft extending axially into said converter upon which said driven member is journalled, means in said housing adjacent said driven member splined on said shaft and axially shiftable relative to said driven member in response to variations in fluid pressure in said housing produced by variations in speed of rotation of said transmitter for clutching and declutching said driven member to said shaft, and spring means normally biasing said means toward declutching position.

3. In a fluid torque transmitting mechanism, a housing driven from a power source and including a driving member, a shaft extending axially into said housing, a driven member rotatably journalled on said shaft, means for introducing fluid into said converter, a radial plate member rotatable on said shaft within said housing adjacent said driven member and movable axially relative thereto, said plate member being subjected to fluid pressure within said housing, a clutch member between said plate member and driven member and splined on said shaft, and spring means normally biasing said plate member away from driven member when said converter is idling but being collapsible to allow said plate member to force said clutch member into clutching engagement with said driven member under the influence of increased fluid pressure whenever said mechanism is operating above idling speed.

4. In a fluid torque transmitting mechanism, a housing driven from a power source and including a driving member, a shaft extending axially into said housing, a driven member rotatably journalled on said shaft within said housing, means for introducing fluid into said converter, said housing forming an annular chamber on the outer side of said driven member, clutch means carried on said driven member, a radial clutch plate in said chamber splined on said shaft and axially shiftable thereon, means for admitting a portion of said fluid to the back side of said plate for forcing it against said clutch means to couple said shaft to said driven member, and spring means normally urging said plate out of clutching engagement when said mechanism is operating at idling speed.

5. In a fluid torque transmitting mechanism, a housing driven from a power source and including a driving member, a shaft extending axially into said housing, a driven member rotatably journalled on said shaft within said housing, means for introducing fluid into said converter, said housing forming an annular chamber on the outer side of said driven member, axially shiftable means in said chamber mounted on said shaft and subject to the pressure of fluid in said converter, clutch means splined on said shaft and interposed between said shiftable means and said driven member, and spring means normally biasing said shiftable means away from said clutch means whereby the fluid pressure in said chamber is insufficient to produce clutching action unless the speed of said mechanism exceeds idling speed.

6. The mechanism of claim 5 wherein said clutch means comprises arcuate friction clutch segments seated in the outer radial face of said driven member.

7. The mechanism of claim 5 wherein said clutch means comprises an annular friction disc supported partially on said driven member.

8. A torque transmitting mechanism comprising an annular housing including a driving member, a shaft extending axially into said housing, a driven member rotatably journalled on said shaft, a flexible clutch disc splined on said shaft, an actuating plate rotatably journalled on said shaft and conjointly rotatable with and axially shiftable relative to said driven member, said disc being interposed between parallel radial surfaces on said plate and driven member, means for introducing oil into said mechanism and into said housing on the outer side of said plate whereby upon normal operation of said mechanism the oil pressure produces shifting of said plate to clamp said disc between said plate and driven member for driving said shaft, and spring means operative when said mechanism drops to idling speed for releasing said clamping action.

ROBERT LAPSLEY.

REFERENCES CITED

The following references are of record in the file of this patent:

UNITED STATES PATENTS

| Number | Name | Date |
| --- | --- | --- |
| 2,055,300 | Maurer | Sept. 22, 1936 |
| 2,351,483 | Carnagua | June 13, 1944 |
| 2,400,093 | Batten | May 14, 1946 |